Nov. 15, 1960

T. EDER 2,960,227

PROCESS AND PLANT FOR SEPARATING GRANULAR
MATERIAL INTO AT LEAST TWO CLASSES

Filed Aug. 3, 1956

INVENTOR.
THEODOR EDER
BY
Bates, Teare, v McBean
ATTORNEYS

United States Patent Office

2,960,227
Patented Nov. 15, 1960

2,960,227

PROCESS AND PLANT FOR SEPARATING GRANULAR MATERIAL INTO AT LEAST TWO CLASSES

Theodor Eder, 32 Reisnerstrasse, Vienna III, Austria

Filed Aug. 3, 1956, Ser. No. 601,890

9 Claims. (Cl. 209—162)

In various fields of engineering in which granular raw material is obtained or processed the several grains of said materials must be subdivided into several classes, kinds or end fractions, which are determined in accordance with certain characteristics such as the grain size or limits for the grain size, the specific gravity etc. The practical performance of said operation requires a separating process, in which the desired sorting of the raw material is obtained with reference to appropriate critical values, such as the grain size, the final velocity of fall, the density etc. Because every actually performed separating process has inevitable defects regarding to the adherence to a critical value and the critical value cannot be adhered to with any desired precision in most cases, particularly under economical conditions, the precision of separation of each separating process must be defined in practice on statistical basis. For instance, in a separating process which effects a separation into two size fractions, e.g., a coarse fraction and a fine fraction, a characteristic value can be based on the probability with which a grain having a certain size enters, e.g., the fine fraction. The quotient $K_{25/75}$ of the diameter of those grains entering the fine fraction with 25% and 75% probability, respectively, is suitable as such a characteristic value. A practical arrangement of perfect precision of separation is characterized by the value $K_{25/75}=1$. The value $K_{25/75}$ is called "grain dispersion."

The size of that grain which will be found with the same probability in the fine fraction or in the coarse one defines obviously the critical value to which a separating process is adjusted which separates according to the grain size and is referred to as the "critical grain size." When the separation is based on any desired characteristic, e.g., as has been mentioned hereinbefore, the specific gravity, etc., the analogous general term "critical value" is employed. Grains which have the characteristic according to which the separation is effected to the extent of that critical value will occur in both fractions in the same number. That fact can serve as a basis for a method for experimentally determining the critical value for a specific plant under specific operating conditions.

Though a separating process for separating granular material into several classes can be performed in many cases in one stage, it has been attempted for a long time to perform the separating process in a series of successive process steps rather than in one step. In accordance therewith several hydraulic separators have been connected in series and the coarses delivered, e.g., from one hydraulic separating stage was further treated in a subsequent stage and the coarses from that second stage were fed to a third one. Then the coarses from the final stage were withdrawn as an end fraction, whereas the fine fractions of the three stages were either also withdrawn or returned to a preceding stage. With such an arrangement the grain dispersion may be improved and the amount of washing water may be reduced but the series arrangements described will in no case give the optimum result which is achievable with a combination of several hydraulic separating stages as regards the precision of separation.

Having the object of providing an improvement in this respect the invention proposes a hydraulic separating process for separating granular material into at least two classes (sorts, end fractions) comprising at least three hydraulic separating steps which are performed in separate separating stages and each of which delivers a subsiding fraction and an overflowing fraction, in which both said fractions from each of said hydraulic separating steps are subjected to another separating operation in chains of at least one of said hydraulic separating stages, and in which end fractions are taken from different chains and the other fractions obtained in the several hydraulic separating stages remain in the separating process. More particularly, each of the two fractions of a hydraulic separating stage delivering two fractions, e.g., a fine fraction and a coarse one, may be subjected in one chain of such hydraulic separating stages to another separating operation and in both chains of said pair of separating chains one of the fractions (e.g., the subsiding fraction) delivered by each stage may be supplied to the following stage and withdrawn as an end fraction from the last stage whereas the other fraction (e.g., the overflowing fraction) is returned to the directly preceding stage. Here and where used hereinafter the term "chain" includes one-link chains, which have only a single hydraulic separating stage. A preferred embodiment of the process of great practical importance will be obtained if at least in one chain of separating stages similar fractions, e.g. the coarse fractions from each stage excepting the last stage are fed to the inlet of the respective directly following hydraulic separating stage whereas the other fraction of each stage, e.g. the fine fraction, is returned to the respective directly preceding separating stage. Hereinafter the two chains, the first separating stage of which is fed with one of every pair of fractions of a separating stage, will be called a pair of separating chains.

In addition to the aspects mentioned already some other factors should be observed if a separating process is to be operated to best success. It is only necessary to realize that the group of grains whose separating characteristic equals the critical value (critical grain) is circulated in the circle of interconnected hydraulic separating stages before it leaves the separating process. Arrangements of special practical importance include hydraulic separating stages which form a pair of separating chains. The fact just mentioned provides a teaching how to adjust the critical value in the several stages of such a pair of separating chains. If the critical grain is contained in a relatively small percentage in the raw material to be separated the separation in the several stages of the pair of separating chains may be effected to the same or approximately the same critical values with a satisfactory quantitative output. When the content of the critical grain is excessive it is advantageous to select for the several stages critical values which increase from the coarses outlet to the fines outlet because this will promote the removal of the critical grain and enable an increase of the permissible rate. In that case it is advisable to cause the specific hydraulic separation flow, related to the liquid surface area in the several hydraulic separation stages, to increase by 5% to 20% per stage in the direction from the coarses outlet to the fines outlet. Specific separation flow rate is expressed in value of liquid per unit of time and unit of area.

A plant for carrying out the process according to the invention comprises at least three hydraulic separators, in which the several process steps are performed. Each of said separators has an inlet for the material to be separated and outlets for a subsiding fraction and for an overflowing fraction, into which the feed is separated by the separating operation performed in said separating stage. Fraction outlets of a separator embodying one hydraulic separating stage are connected to the inlet of the first link of chains including at least one hydraulic separator. Hydraulic separators belonging to different chains are provided with end fraction outlets; the other fraction outlets of the several hydraulic separators are connected to the inlets of other separators. More particularly, each of the two fraction outlets of a hydraulic separator may be connected to the inlet of the first hydraulic separator of a chain of such separators and the one fraction outlet of each of the hydraulic separators of a chain, excepting the last one, may be connected to the inlet of the next following hydraulic separator whereas the other fraction outlet is connected to the inlet of the directly preceding separator.

A fuller explanation of the invention will be given in the description of illustrative embodiments shown in the accompanying drawing, in which Fig. 1 shows the arrangement of a plant according to the invention having three hydraulic separating stages.

In all diagrams the separating stages are shown as triangles. Straight lines extending from a corner which symbolizes the inlet subdivide the triagonal area into two sectors, which are provided with different markings (hatching) and indicate that the material fed to the stage is separated into two fractions. One corner of said (triangular) part areas is to symbolize the fraction outlet.

Figure 1:
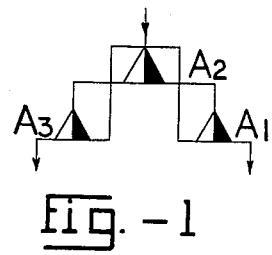

Fig. 1 shows a particularly advantageous arrangement of said hydraulic separating stages, each of which delivers two fractions, a coarse fraction and a fine fraction. The raw material is fed to a first stage $A_2$ and is divided therein into two fractions. Each of said two fractions is fed to the inlet of a subsequent hydraulic separating stage, the fines fraction to stage $A_3$, the coarses fraction to stage $A_1$. In accordance with the assumption made hereinbefore each of said stages are to be considered a one-link chain of separating stages, more particularly of hydraulic separating stages. The further treatment of each of the two fractions delivered by $A_2$ in one chain of separating stages corresponds to the main feature of the invention. In accordance with other features of the invention the fine fraction from $A_3$ and the coarse fraction from $A_1$ are withdrawn from the process as end fractions from different chains of separating stages whereas the two other fractions are returned to the inlet of stage $A_2$.

A particularly advantageous embodiment of the apparatus, operating with a high precision of separation, will be obtained if the effective separation area of the hydraulic separators in the chain which is provided with the end outlet of the overflowing fraction of a pair of separating chains is larger than the effective separation area of the separators of the chain provided with the end outlet of the subsiding fraction. To enable a high load the effective separation area of the hydraulic separators of at least one pair of separating chains may decrease in the chain provided with the end outlet of the overflowing fraction towards the same from stage to stage whereas the effective separation area of the hydraulic separators in the chain provided with the end outlet for the subsiding fraction increases towards the same from stage to stage.

Figure 2:
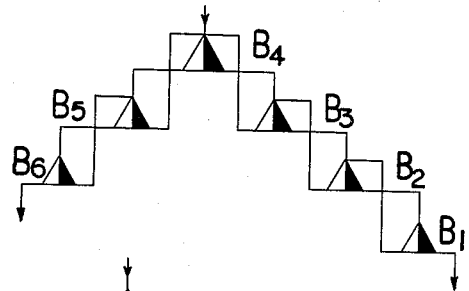
Fig. 2 is a diagram of connections of a plant comprising two chains, each of which includes several hydraulic separating stages.

The basic arrangement shown by way of example in Fig. 1 can be generalized in several respects within the scope of the invention. Fig. 2 shows the arrangement of a multistage hydraulic separating process. Raw feed is fed to the inlet of a first hydraulic separating stage $B_4$. Both fractions leaving said stage are subjected to another separation in the first hydraulic separating stages $B_5$ and $B_3$ of chains of hydraulic separating stages. The fine fraction leaving $B_5$ comes into the inlet of a stage $B_6$ connected behind the same whereas the coarse fraction from $B_5$ is returned to $B_4$. The fine fraction from $B_6$ forms one end fraction, the coarse fraction of that stage is returned to the directly preceding stage $B_5$. Two additional hydraulic separating stages $B_2$, $B_1$ are connected behind the hydraulic separating stage $B_3$. The coarse fraction is always fed to the inlet of the immediately following stage or is withdrawn as an end fraction at the end stage $B_1$. The fine fractions from all separators $B_3$, $B_2$, $B_1$ of the chain are introduced into the respective immediately preceding separating stages $B_4$, $B_3$, $B_2$ and are thus reintroduced into the separating process. According to the princpiles discussed any desired number or process steps can be performed in a corresponding number of stages in each of both chains. The principle of the arrangement is significant inasmuch as with an increasing number of links in the two separating chains the grain of the entire plant tends to approach the ideal value $K_{25/75}=1$ whereas with separating processes which use a series of process steps in a single chain the precision of separation does increase with an increasing number of individual stages but the corresponding limiting value of the grain dispersion will in no case coincide with the ideal value. Thus the performance of a separating process according to the invention, using a sequence of imperfect, but practicable process steps, enables any desired approach to the result of a plant having an absolute precision of separation. This is not achievable with the previous multistage processes.

Figure 3:
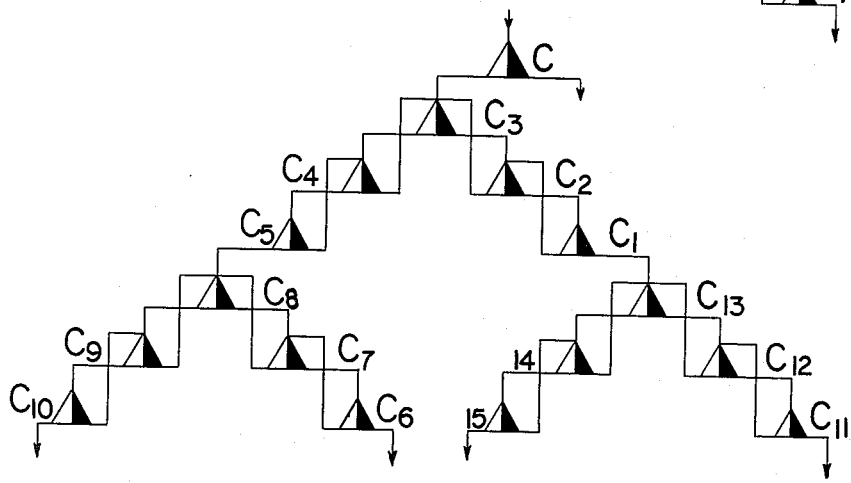
Fig. 3 is the diagram of a plant comprising several chains of hydraulic separating stages.

Fig. 3 shows an arrangement of hydraulic separating stages which enables a separation of granular raw material into four classes (end fractions). In a first separating stage C raw feed is freed from its coarsest components, which are removed from the separating process. The fine fraction discharged from C enters the inlet of a subsequently arranged $C_3$ and is divided therein in two fractions, each of which is subjected in the subsequently arranged stages $C_4$, $C_5$ and $C_2$, $C_1$ respectively, to a sequence of process steps. In the chain $C_4$, $C_5$ the fine fraction from each stage is fed to the respective subsequent stage whereas the coarse fraction is returned to the preceding stage. In the chain $C_2$, $C_1$ the coarse fraction from each stage is fed to the inlet of the next following stage whereas the fine fraction is returned to the foregoing separating stage. The fine fraction from $C_5$ and the coarse fraction from $C_1$ are fed to the hydraulic separating stages $C_8$ and $C_{13}$, respectively, whose fine fractions are subjected to another separation in the pairs $C_9$, $C_{10}$; $C_7$, $C_6$ and $C_{14}$, $C_{15}$; $C_{12}$, $C_{11}$ of chains of hydraulic separating stages. The individual fractions are handled in each of said pairs in exact analogy with the handling of the fractions in the pair $C_4$, $C_5$; $C_2$, $C_1$ of chains of hydraulic separating stages. The fine fractions from the end stages $C_{10}$, $C_{15}$ and the coarse fractions from the end stages $C_6$, $C_{11}$ form the four end fractions.

Figure 4:
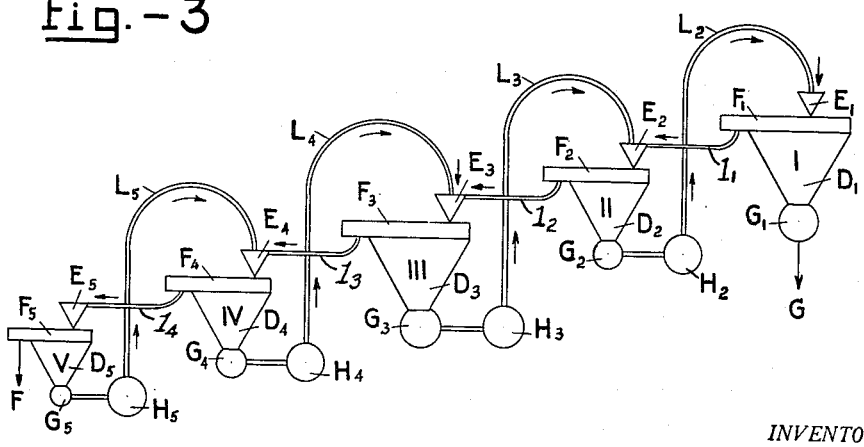
Fig. 4 is a diagram of a five-stage hydraulic separating plant.

Fig. 4 is a diagrammatic showing of an illustrative embodiment of a plant having five separators combined in one pair of separating chains. All separating stages are formed as horizontal sedimentation units, each of which delivers a fine fraction and a coarse fraction. Each of said units comprises a sedimentation vessel $D_1$, $D_2$ ... $D_5$, having an inlet $E_1$, $E_2$ ... $E_5$, fines overflow $F_1$, $F_2$ ... $F_5$ and a coarses outlet $G_1$, $G_2$ ... $G_5$ attached to the bottom. Lines $L_5$, $L_4$, $L_3$ and $L_2$ lead from the coarses outlets of the stages V, IV, III and II into the inlets of the stages IV, III, II and I, whereas the fines overflows of the last-mentioned stages are connected by lines $l_4$, $l_3$, $l_2$ and $l_1$ to the inlets $E_5$, $E_4$, $E_3$ and $E_2$ of the previously mentioned separating stages. The lines $L_5 \ldots L_2$ incorporate handling means $H_5 \ldots H_2$, as pumps, which raise the sediment of the corresponding sedimentation vessels. The fines overflow of stage V and the coarses outlet of stage I form the outlets for the two end fractions.

Raw material mixed with water is fed at a rate of, e.g., 10 cubic meters per hour to the inlet $E_3$ of stage III. Washing water at a rate of, e.g., 20 cubic meters per hour is added to the inlet $E_1$ of stage I. In accordance with the arrangement according to the invention the coarse fractions from stages V, IV, III and II, which have settled out as sediment in the corresponding sedimentation vessels, are raised to the inlets of stages IV, III, II and I, whereas the overflowing fine fractions flow into the inlets of the first-mentioned stages. With the said rates for the raw material and washing water the rate of fines overflow may be expected to amount, e.g., to about 20 cubic meters per hour in each of stages I and II and, e.g., to about 30 cubic meters per hour in stages III and IV. If the vessel $D_1$ has an effective separation surface of 10 square meters and the specific hydraulic separation flow rate in the several sedimentation stages is to be increased according to the invention by about 20% per stage in the direction from the coarses outlet to the fines outlet, the vessels $D_2$, $D_3$, $D_4$ and $D_5$ must have sedimentation areas of about 8.5 square meters, 10.5 square meters, 8.6 square meters, and 7.3 square meters, respectively.

I claim:

1. A hydraulic separating process for separating granular material into at least two end fractions, which comprises subjecting the material to hydraulic separation in an initial hydraulic stage to obtain a subsiding and an overflowing fraction, the overflowing fraction from said hydraulic stage being subjected to further separation in a first-single stage, and the subsiding fraction from said hydraulic stage being subjected to further separation in a second single stage, the overflow fraction from said first single stage being withdrawn from the process, and the subsiding fraction from said first single stage being returned to said initial hydraulic stage, the subsiding fraction from said second single stage being withdrawn from the process, and the overflow fraction from said second single stage being returned to said initial hydraulic stage.

2. A hydraulic separating process for separating granular material into at least two end fractions, which comprises subjecting the material to hydraulic separation in an initial hydraulic stage to obtain a subsiding fraction and an overflowing fraction, the overflowing fraction from said hydraulic stage being subjected to further separation in a single stage, and the subsiding fraction from said hydraulic stage being subjected to further separation in a chain of successive separating stages comprising two or more separating stages, the overflow fraction from said single stage being withdrawn from the process and the subsiding fraction from said single stage being taken to said initial hydraulic stage, the subsiding fraction from the last stage of said chain being withdrawn from the process, and the overflowing fraction from each stage of said chain being taken to the immediately preceding stage of said chain, and the subsiding fraction from each stage in said chain being taken to the immediately following stage, with the exception of the last stage of said chain.

3. A hydraulic separating process for separating granular material into at least two end fractions which comprises subjecting the material to hydraulic separation in an initial hydraulic stage to obtain a subsiding fraction and an overflowing fraction, the overflowing fraction from said hydraulic stage being subjected to further separation in a first chain of successive separating stages and the subsiding fraction from said hydraulic stage being subjected to further separation in a second chain of successive separating stages, each of said chains comprising two or more separating stages, the overflow fraction from the last stage of said first chain being withdrawn from the process and the subsiding fraction from each stage of said first chain being taken to the immediately preceding stage of said first chain, and the overflowing fraction from each stage in said first chain being taken to the immediately following stage with the exception of the last stage of said first chain, the subsiding fraction from the last stage of said second chain being withdrawn from the process and the overflowing fraction from each stage of said second chain being taken to the immediately preceding stage of said second chain and the subsiding fraction from each stage in said second chain being taken to the immediately following stage with the exception of the last stage of said second chain.

4. A hydraulic separating process according to claim 3 wherein at one of the stages in the first chain the subsiding fraction instead of being returned to the immediately preceding stage is subjected to a third chain of successive separating stages comprising one or more separating stages, wherein the subsiding fraction from the last stage in the third chain is withdrawn from the process but wherein the overflow fraction from each stage of the third chain is taken to the immediately preceding stage of said third chain, and wherein the subsiding fraction from each stage of said third chain is taken to the immediately following stage, with the exception of last stage of said third chain.

5. A hydraulic separating process according to claim 3 wherein the overflow fraction from one stage in the second chain is subjected to further separation in a third chain of successive separating stages, comprising one or more separating stages, and wherein the overflow fraction from the last stage in the third chain is withdrawn from the process, and the subsiding fraction from each stage of the third chain is taken to the immediately preceding stage of said third chain, while the overflow fraction from each stage of the third chain is taken to the immediately following stage of the third chain with the exception of the last stage of said third chain.

6. A plant for separating granular material into at least two end fractions, comprising at least three hydraulic separators, each of which has an inlet and outlets for a subsiding fraction and for an overflowing fraction, respectively, in which one outlet from a first separator is connected to the inlet of a second separator, and the other outlet is connected to the inlet of the third separator, one of the outlets from each of said second and third separators comprising an end fraction outlet and the other outlet of each of said second and third separators being connected to the inlet of said first separator.

7. A plant as set forth in claim 6, wherein the second separator forms the head of one chain of a plurality of separators, and the third separator forms the head of a second chain of a plurality of separators, and wherein one outlet from each separator except the last separator of a chain, is connected to the succeeding separator in said chain, and the other outlet from each separator of a chain is connected to the inlet of one of the preceding separators in said chain.

8. A plant as set forth in claim 7, in which the effective separating area of the separators is larger in the chain connected to the outlet for the overflowing fraction of said first separator than in the chain connected to the outlet of the subsiding fraction of said first separator.

9. A plant as set forth in claim 8, in which each of said chains comprises several ones of said separators and one of the outlets of each of said chain separators excepting the last separator of each chain is connected to the inlet of the next following separator, the other one of said outlets of each of said chain separators is connected to the inlet of the immediately foregoing separator, the effective separation area of the separators of the chain connected to the outlet for the overflowing fraction of said first separator decreases successively from the first to the last separator of said chain and the effective separation area of the separators of the chain connected to the outlet for the subsiding fraction of said first separator increases successively from the first to the last separator of said chain.

References Cited in the file of this patent

UNITED STATES PATENTS

| | | |
|---|---|---|
| 1,914,039 | Parkinson | June 13, 1933 |
| 2,136,281 | Dickinson | Nov. 8, 1938 |